July 21, 1942 F. GOTTSCHALK ET AL 2,290,805

APPARATUS FOR CALCINING GYPSUM

Filed Aug. 3, 1940 2 Sheets-Sheet 1

Inventors:
Fred Gottschalk
Clair L. Bruner
by Edw A Hampson Atty.

July 21, 1942. F. GOTTSCHALK ET AL 2,290,805

APPARATUS FOR CALCINING GYPSUM

Filed Aug. 3, 1940 2 Sheets-Sheet 2

Inventors:
Fred Gottschalk
Clair L. Brunner
by Edw. A. Hampson, Atty

Patented July 21, 1942 2,290,805

UNITED STATES PATENT OFFICE 2,290,805

APPARATUS FOR CALCINING GYPSUM

Fred Gottschalk and Clair L. Bruner, Port Clinton, Ohio, assignors to The Celotex Corporation, Chicago, Ill., a corporation of Delaware Application August 3, 1940, Serial No. 350,292

3 Claims. (Cl. 263—11)

This invention relates to a method and apparatus for calcining gypsum for gypsum stucco for the manufacture of plaster board, lath, plaster, etc., and more particularly to a novel form of gypsum kettle wherein the gypsum may be calcined more efficiently.

It is well known that in the past various forms of gypsum kettles have been used for calcining gypsum, but the kettles used previously have been somewhat inefficient particularly in fuel consumption. Furthermore, the gypsum kettles previously used have been either fabricated from cast iron or very heavy sheet metal causing a considerable loss of time and a large fuel loss in bringing the kettles up to temperature for calcining.

It is the principal object of this invention to provide a more efficient method of calcining gypsum to remove the water of crystallization to form certain commercial products as gypsum stucco, plaster, and the like wherein the apparatus used is similar to the previous type of gypsum kettles but the kettles themselves are fabricated from thin sheet metal and the stresses set up in bringing these kettles up to the temperature necessary for calcining are taken care of by a novel type of flue construction wherein an expansion joint is provided in the flues to take care of the stresses set up by the expansion and contraction of the gypsum kettles.

Another object of the invention is to provide a novel flue construction wherein the expansion and contraction of the gypsum kettle is provided for by a novel form of telescoping flue construction.

Another object of the invention is to provide a novel form of shell construction wherein the bottom half of the shell of the kettle may be readily removed and replaced whenever the kettle is burned out.

Still another object of the invention is to provide a novel form of bottom construction for the gypsum kettle wherein the bottom may be readily removed and replaced from time to time, as it is needed.

The foregoing and other objects which will be evident to those skilled in the art are attained by the structure hereinafter described and claimed and illustrated in the accompanying drawings wherein:

Figures 1, 2:
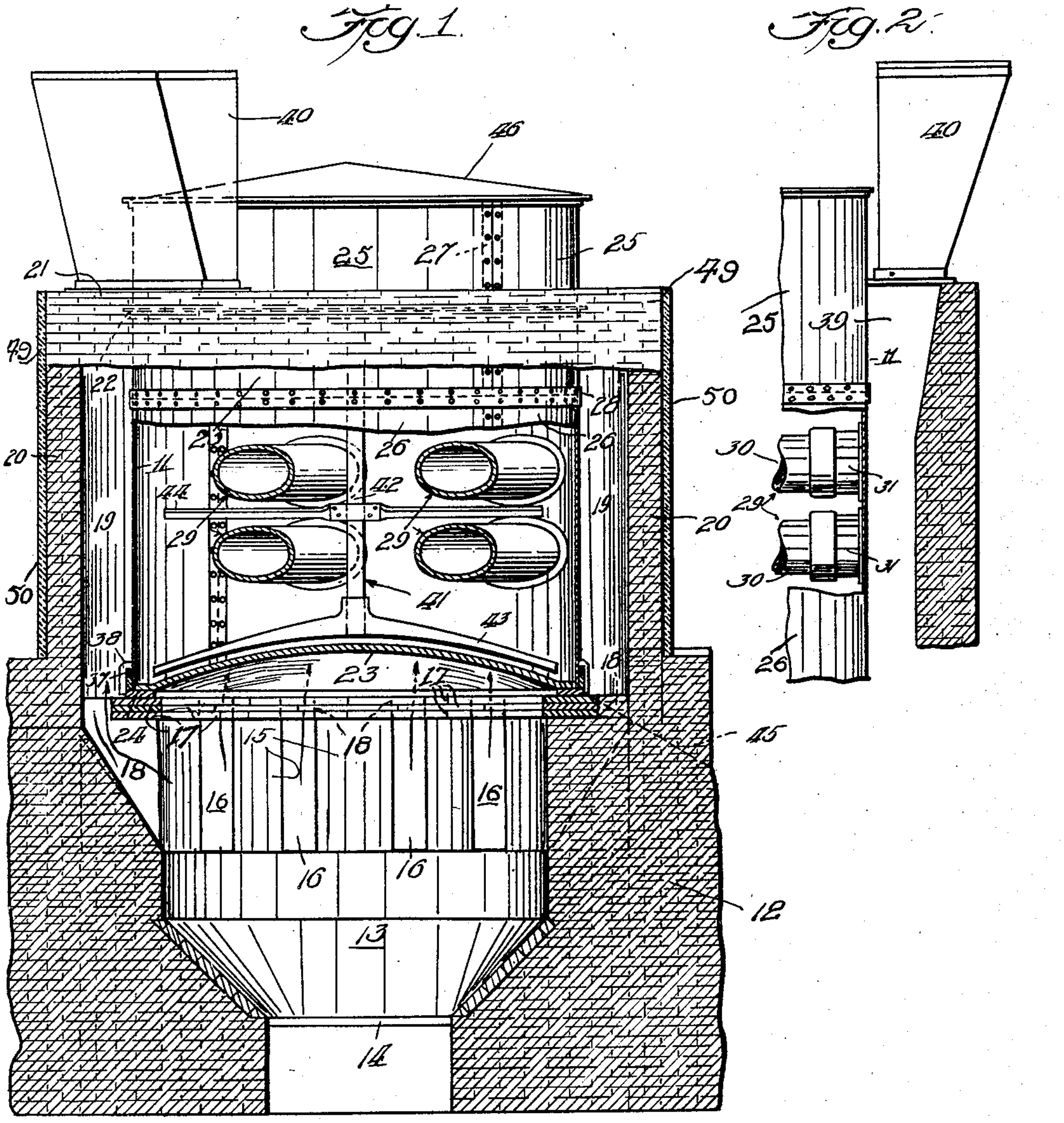
Figure 1 illustrates the gypsum kettle construction in elevation and partly in section mounted on its setting to provide for circulation of the hot products of combustion about the gypsum kettle.
Figure 2 is a view in elevation and partly in section illustrating the connection of the telescoping flues to the stack.
Figure 3:
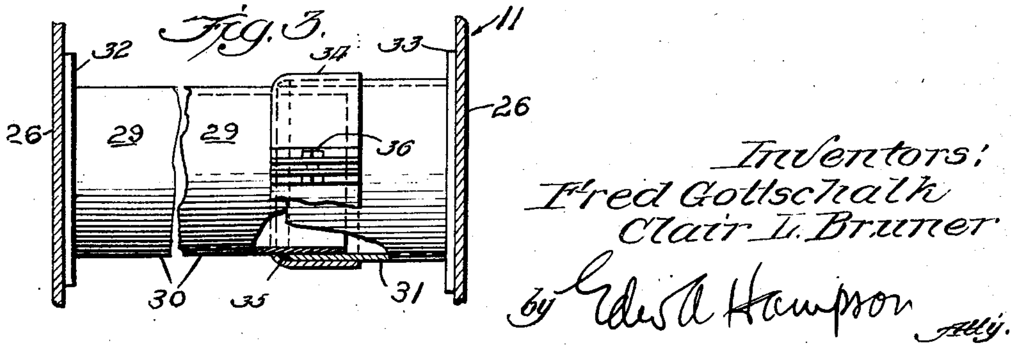
Figure 3 is a plan view of the telescoping flue partly in section illustrating the packing therefor.
Figure 4:
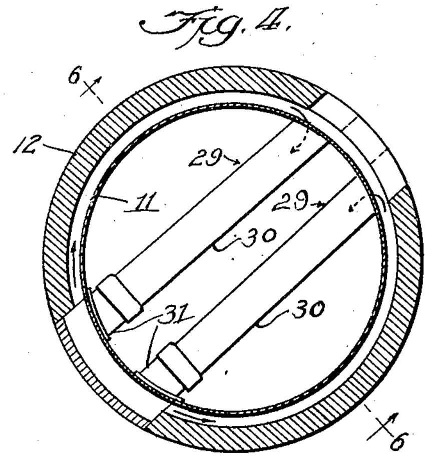
Figure 4 is a diagrammatic sectional view along line 4—4 of Figure 6 illustrating the flow of gases about the outside of the gypsum kettle and through the telescoping flue.
Figure 5:
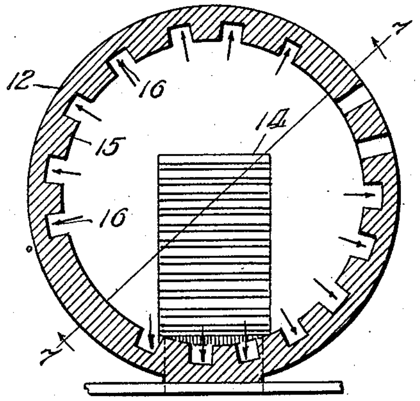
Figure 5 is a diagrammatic sectional view along line 5—5 of Figure 7 with the kettle removed illustrating the flow of gases through the passageways in the piers for the gypsum kettle foundation.
Figure 6:
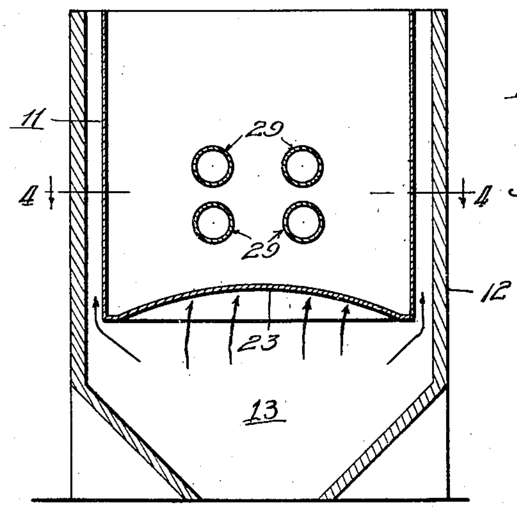
Figure 6 is a diagrammatic vertical sectional view on line 6—6 of Figure 4 illustrating the path of the flow of gases around the gypsum kettle.
Figure 7:
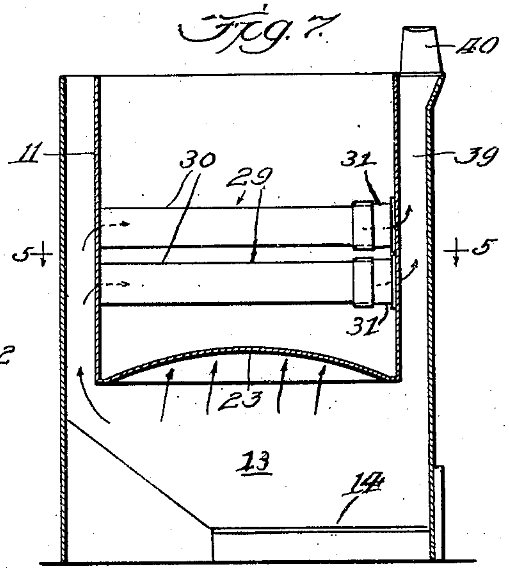
Figure 7 is a diagramatic vertical sectional view along line 7—7 of Figure 5 illustrating the vertical path of the hot products of combustion and also their path through the flue into the stack.

The invention is illustrated and described with reference to a gypsum kettle 11 supported on a suitable foundation 12. The foundation 12 for the gypsum kettle is provided with the usual fire box 13 and grate construction 14. Annularly formed with respect to the foundation 12 are piers 15 for supporting the gypsum kettle 11. The piers 15 are annularly arranged about the fire box 13 and provide flues 16 radially arranged about the circumference of the fire box to provide a plurality of passages about the circumference of the gypsum kettle which is supported on the piers 15 of the foundation.

An annular support 17 is supported by the piers 15 and such is formed of ring brick and so mounted at the upper ends of the piers 15 that ports 18 are provided at the upper portion of the foundation 12 and formed by the annular support 17 and the upper portion of the piers 15. The ports 18 therefore provide discharge openings about the circumference of the kettle and the parts 18 are annularly arranged and radially spaced about the circumference of the gypsum kettle.

To form an annular passage for the circulation of the flue gases about the gypsum kettle the foundation 12 is carried up with an annular brick wall construction 20. The annular wall 20 is carried up to substantially ¾ of the height of the gypsum kettle as measured from the top of the piers 15, and the annular
over in a suitable manner
struction 21 suitable
able suppo ious slumps as they take place in the calcining of the gypsum.

In the operation of a battery of gypsum kettles, one of which has been described above, it is preferred to have a banked fire in the fire boxes started several hours prior to the regular starting time to get the kettles partially heated up. At the starting time, the firemen build up the fire, and after fifteen minutes have elapsed they start filling up the kettles and keep at it until the kettles are completely filled. During this entire time, the firemen are building up the fire as rapidly as possible. From the time a kettle is filled completely, it usually takes an hour to an hour and ten minutes to complete the calcination. When the proper point is reached, and this is usually determined by what is known as either the first slump or the second slump of the gypsum in the kettle and depending upon the purpose of which the calcined gypsum is used, either the first slump or second slump is used to determine whether the calcination period has been completed. When this point is reached, the kettle is dumped into the hot pit. The gypsum is then discharged through the discharge spout 45 to the hot pit not shown and the agitating mechanism 41 is operated and the kettle scraped with the scraping mechanism 43 until it is completely empty. At the same time that the kettle is dumped, the firemen are signalled to let the fire die down considerably so as not to have too high a heat during the dumping period.

A typical kettle record for a battery of four kettles for five cycles in which twenty kettles are calcined is given in the tabulated kettle record following:

*Kettle record*

| | Kettle No. | Commence filling | Finish filling | Off | Degree F. | Time | Set |
|---|---|---|---|---|---|---|---|
| I | 1 | 3:20 | 3:45 | 4:40 | 330 | 1 hour 20 minutes | S |
| | 2 | 3:20 | 3:40 | 4:50 | 330 | 1 hour 30 minutes | S |
| | 3 | 3:20 | 3:50 | 4:35 | 330 | 1 hour 15 minutes | O |
| | 4 | 3:20 | 3:45 | 4:35 | 330 | 1 hour 15 minutes | O |
| II | 1 | 4:40 | 5:05 | 5:55 | 330 | 1 hour 15 minutes | S |
| | 2 | 4:50 | 5:05 | 6:05 | 330 | 1 hour 15 minutes | S |
| | 3 | 4:35 | 5:00 | 6:05 | 330 | 1 hour 30 minutes | O |
| | 4 | 4:35 | 5:05 | 6:05 | 330 | 1 hour 30 minutes | O |
| III | 1 | 5:55 | 6:20 | 7:20 | 330 | 1 hour 25 minutes | S |
| | 2 | 6:05 | 6:30 | 7:30 | 330 | 1 hour 25 minutes | S |
| | 3 | 6:05 | 6:30 | 7:35 | 330 | 1 hour 30 minutes | O |
| | 4 | 6:05 | 6:30 | 7:30 | 330 | 1 hour 25 minutes | O |
| IV | 1 | 7:20 | 7:45 | 9:00 | 330 | 1 hour 40 minutes | S |
| | 2 | 7:30 | 7:55 | 9:05 | 330 | 1 hour 35 minutes | S |
| | 3 | 7:35 | 8:05 | 9:00 | 330 | 1 hour 30 minutes | O |
| | 4 | 7:30 | 8:00 | 9:15 | 330 | 1 hour 45 minutes | O |
| V | 1 | 9:00 | 9:25 | 10:30 | 330 | 1 hour 30 minutes | S |
| | 2 | 9:05 | 9:30 | 10:40 | 330 | 1 hour 35 minutes | S |
| | 3 | 9:00 | 9:35 | 10:35 | 330 | 1 hour 35 minutes | S |
| | 4 | 9:15 | 9:40 | 10:50 | 330 | 1 hour 35 minutes | S |

S-Treatment with salt spray.
O-Treatment with sulphonated castor oil.

Figure 8:
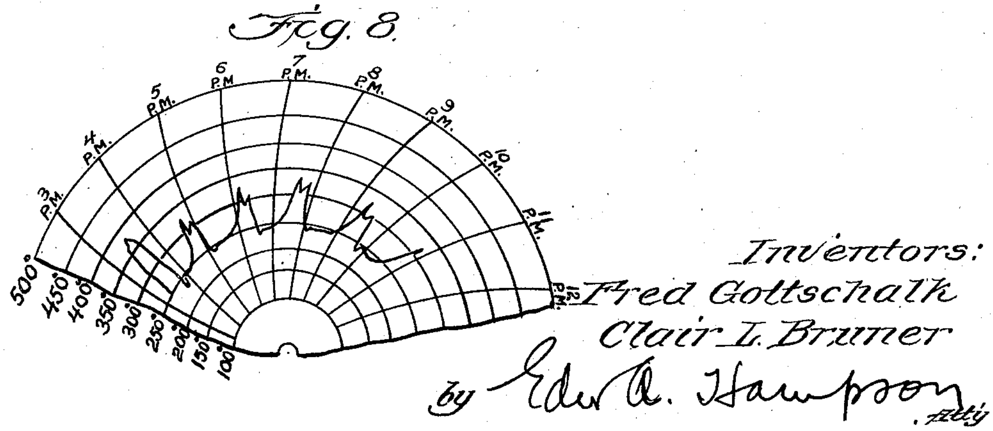
Figure 8 is a temperature time diagram of a kettle taken over a period of time necessary for calcining five batches of gypsum.

The above kettle record is a typical kettle record for a day for a battery of four kettles in which there have been twenty kettles calcined. Referring to the kettle record, kettle No. 4 throughout the period is continuously recorded on a recording thermometer and the temperature is continuously plotted as a function of time, as it is illustrated in Figure 8. On the chart shown in Figure 8 are shown the various fluctuations in temperature as the kettle is brought up to the correct temperature to when it is discharged and again refilled, and so on. It is to be noted that the first kettle was brought above the usual heat to substantially 380° but this fluctuation was due to the fact that it was when the kettles were first brought up to temperature and therefore the heat of the fire brick, etc., caused the temperature to rise above what is usually sufficient for the proper calcination. It is preferred to dump the kettle after the kettle has reached a calcination temperature of substantially 330° F. as is noted in the kettle record and also on the temperature time chart of Figure 8. It is therefore preferred to calcine a batch of gypsum within the temperature range of from substantially 230° to 330° although there are times, particularly that of calcining the first kettle as the fires are started, that the temperature of calcining varies within the range of from substantially 230° F. to 470° F. It is preferred not to operate within the higher range to 470° and this higher range is due primarily to the fact that the kettles are empty when the operation is first started in the morning and the temperature may get out of control of the operator. Furthermore, it is not desired to operate within this temperature range as this higher temperature range causes the kettles to become burned out much sooner than if the kettles are operated within the preferred temperature range.

When the dumping of the kettles is completed, the operators immediately start refilling the kettles and signal the firemen to again build up the fires.

Referring to the kettle record and also the temperature time chart of Figure 8, it is to be noted that there is an apparent discrepancy in time of calcination for each kettle. In the tabulation of the kettle record for kettle No. 4 of this battery, it is to be noted that the time varied from one hour and fifteen minutes to one hour and thirty minutes, to one hour and twenty-five minutes, one hour and forty-five minutes, and also one hour and thirty-five minutes. As to this apparent discrepancy in time, there is some loss of time usually between each kettle, and on the first kettle of the run, the time usually runs somewhat longer due to heat absorbed by the kettle and the setting. The kettles which are calcined later are usually run off in about one hour and fifteen minutes. With this novel form of gypsum kettle as disclosed above, calcination can be done in substantially one hour, but if it is done continuously during this short period of time, due to the higher temperature which must be employed, the life of the kettle and setting is shortened considerably and also there is not the uniformity of calcination ordinarily obtained as the result of the longer period of calcination of substantially one hour and fifteen minutes. The desired period of calcination, therefore, varies within the range of from one hour to one hour and forty-five minutes with the preferred period being substantially one hour and fifteen minutes.

With applicant's novel form of gypsum kettle and particularly due to the novel type of thin-wall kettle with expansion type of flues to take care of the stresses and strains set up within the kettle, it is possible to calcine into stucco from gypsum rock substantially thirteen tons of the finished product from fifteen to eighteen tons of gypsum rock as originally loaded into the kettles. Average typical runs for a two months period are respectively 12.72 tons of stucco from 15.9 tons of rock per kettle, and 12.64 tons of stucco from 15.8 tons of rock per kettle. The coal or fuel consumption necessary to calcine this amount of stucco per kettle is substantially 1200 pounds of coal per kettle as compared to 1400 pounds of coal used for calcination of the same amount of material into stucco with kettles of the prior art. It is obvious from the description above that there is not only substantial saving in fuel consumption with the use of this novel form of kettle but that the number of kettles within a given period which may be calcined is greatly increased because of shortening of time necessary to calcine a kettle of gypsum rock.

It is believed that the increase in efficiency in the operation in calcination with applicant's novel gypsum kettle construction and mounting therefor is primarily due to the thinness of the wall construction of the kettle permitting a greater rate of transmission from the flue gases or hot products of combustion to the gypsum rock being calcined. As illustrated in Figures 4 to 7 inclusive, it is also believed that the form of kettle setting and kettle construction permits a very uniform distribution of the hot products of combustion about the kettle as well as through the flues to heat the material and drive off the water of crystallization from the rock within the center of the kettle to properly calcine the material for its particular use and that the thin flue construction permits of a greater rate of heat transmission from the hot products of combustion to the material being calcined. Because of this greater rate of transmission from the products of combustion to the rock being calcined and increase of stresses in and distortion resulting in the kettle construction, the novel form of expansion joint for the flues, and the flues transversely mounted with respect to the kettle compensates for stresses set up within the kettle and the distortion of so thin-walled a kettle.

As the circulation of the products of combustion is clearly shown by the arrows in Figures 4 to 7 inclusive, which indicate the path of travel of the hot products of combustion, it is believed not necessary to further describe the path of these products of combustion by referring to the drawings in detail.

It is evident that there has been disclosed a simple structure in the form of a gypsum kettle used for calcination of gypsum rock into stucco for plaster or other commercial forms thereof wherein the efficiency of a calcination operation by the use of a gypsum kettle is greatly increased. The efficiency of the gypsum kettle construction is also increased by suitably insulating the annular wall construction as at 49. The insulation is retained in place by a suitable sheet metal shell 50. The novel form of gypsum kettle disclosed has also been so constructed that the bottom half of the shell is readily removable by cutting off the rivets and the bottom is in one piece cast steel so that not only the bottom of the kettle but also the bottom portion of the shells when they are burned out may be readily removed and replaced by removing a portion of the brickwork of the setting for the gypsum kettle.

The preferred embodiment of the invention herein described as well as the method of operation of the gypsum kettle are also capable of certain modifications without departure from the scope of the invention to be defined in the following claims.

What is claimed is:

1. A gypsum calcining kettle construction comprising a cylindrical shell portion, a bottom secured to the lower part of the shell portion and telescoping flues each comprising a plurality of telescoping flue sections affixed to the lower shell section, said telescoping flues placed in pairs and each pair substantially horizontally positioned with respect to the other across the bottom portion of the lower shell section, each of said telescoping flues comprising telescoping flue sections, one of said telescoping flue sections having thereon adjacent its outer end a sleeve concentric with the flue section and forming an annular recess between the respective contiguous walls of the flue section and sleeve, the other telescoping flue section telescopically engaged in said recess whereby the flue sections together provide a flue construction within the gypsum kettle whereby stresses and strains set up within the shell are compensated.

2. As an article of manufacture a telescoping flue construction for a gypsum kettle comprising telescoping flue sections, one section having mounted thereon adjacent its outer end a sleeve member spaced from but concentric with the wall of the flue section and forming an annular recess between a wall of the flue section and a wall of the sleeve, the other telescoping flue section adapted at its outer end to enter into said annular recess whereby the sleeve on the one telescoping flue section overlies the end of the other telescoping flue section and means provided at the other ends of the respective telescoping flue sections whereby the telescoping flue sections and expansion sleeve may be affixed to the gypsum kettle construction.

3. A gypsum calcining kettle construction comprising a cylindrical shell portion and a circular bottom portion secured adjacent the lower part of the cylindrical shell portion and a plurality of flues extending across the kettle and at their ends secured to the cylindrical shell portion, each of the said flues provided intermediate its ends with an expansion joint whereby stresses and strains set up within the shell portion and within the bottom portion of the kettle are compensated for.

FRED GOTTSCHALK.
CLAIR L. BRUNER.